United States Patent [19]

Hale et al.

[11] Patent Number: 5,076,373
[45] Date of Patent: Dec. 31, 1991

[54] DRILLING FLUIDS

[75] Inventors: Arthur H. Hale; George C. Blytas; Ashok K. R. Dewan, all of Houston, Tex.

[73] Assignee: Shell Oil Company, Houston, Tex.

[21] Appl. No.: 671,987

[22] Filed: Mar. 19, 1991

Related U.S. Application Data

[60] Continuation-in-part of Ser. No. 503,411, Mar. 30, 1990, abandoned, which is a continuation-in-part of Ser. No. 377,739, Jul. 10, 1989, abandoned, which is a division of Ser. No. 167,669, Mar. 14, 1988, abandoned.

[51] Int. Cl.$^5$ ............... E21B 21/00; E21B 49/00; C09K 7/02
[52] U.S. Cl. ........................... 175/40; 175/50; 175/65
[58] Field of Search ............... 175/40, 50, 65, 66; 252/8.51, 8.513, 8.514; 73/153

[56] References Cited

U.S. PATENT DOCUMENTS

| | | | |
|---|---|---|---|
| 2,191,312 | 2/1940 | Cannon | 252/8.511 |
| 2,423,144 | 7/1947 | Gregg | 252/8.511 X |
| 2,573,960 | 11/1951 | Fischer | 252/8.515 |
| 2,697,692 | 12/1954 | Salathiel | 252/8.515 |
| 3,223,622 | 12/1965 | Lummus et al. | 175/65 X |
| 3,301,323 | 1/1967 | Parsons | 166/902 X |
| 3,310,125 | 3/1967 | Darley | 175/66 |
| 3,639,233 | 2/1972 | Schultz et al. | 252/8.515 X |
| 3,728,259 | 4/1973 | Christman | 175/65 X |
| 3,738,437 | 6/1973 | Scheuerman | 175/71 X |
| 4,053,422 | 10/1977 | Walker | 252/8.51 |
| 4,456,067 | 6/1984 | Pinner, Jr. | 166/279 |
| 4,478,612 | 10/1984 | Diaz et al. | 55/29 |
| 4,508,628 | 4/1985 | Walker et al. | 252/8.515 |
| 4,597,779 | 7/1986 | Diaz | 166/267 X |
| 4,780,220 | 10/1988 | Peterson | 252/8.551 X |
| 4,802,998 | 2/1989 | Mueller et al. | 252/8.514 |

FOREIGN PATENT DOCUMENTS

| | | |
|---|---|---|
| 324887A | 1/1988 | European Pat. Off. . |
| 374671A | 12/1988 | European Pat. Off. . |
| 382070A | 2/1989 | European Pat. Off. . |
| 382071A | 2/1989 | European Pat. Off. . |
| 386636A | 3/1989 | European Pat. Off. . |
| 386638A | 3/1989 | European Pat. Off. . |
| 391251A | 4/1989 | European Pat. Off. . |
| 391252A | 4/1989 | European Pat. Off. . |
| 398112A | 5/1989 | European Pat. Off. . |
| 398113A | 5/1989 | European Pat. Off. . |
| 399270A1 | 5/1989 | European Pat. Off. . |
| 374672A | 12/1989 | European Pat. Off. . |
| 2216573A | 10/1989 | United Kingdom . |
| 2216574A | 10/1989 | United Kingdom . |
| 2223255A | 4/1990 | United Kingdom . |

Primary Examiner—George A. Suchfield

[57] ABSTRACT

Drilling fluid properties are enhanced by incorporation thereinto of an alcohol such as glycerol, partially hydrolyzed polyacrylamide and, optionally, salt.

7 Claims, 3 Drawing Sheets

□ FRESH WATER PECP
○ FRESH WATER POLS
+ 2.5% NaCl PECP
⊕ 2.5% NaCl POLS
◇ 5% NaCl PECP
○ 5% NaCl POLS
△ 10% NaCl PECP
⊙ 10% NaCl POLS
× 20% NaCl PECP
⊛ 20% NaCl POLS

DRILLING FLUIDS

This is a continuation-in-part of application Ser. No. 07/503,411, filed Mar. 30, 1990, now abandoned, which is a continuation-in-part of application Ser. No. 07/377,739, filed July 10, 1989, now abandoned, which is a division of application Ser. No. 07/167,669, filed Mar. 14, 1988, now abandoned.

BACKGROUND OF THE INVENTION

This invention relates to water base drilling fluids. More particularly, the invention relates to water base drilling fluids having improved characteristics which allow low temperature drilling operations, inhibit formation of gas hydrates which form at low temperatures and high pressures, reduce shale dispersion which results in improved wellbore stability, reduce drilling fluid loss, and are environmentally more safe.

Water base drilling fluids (or muds) generally comprise water, clays or polymers (polyacrylamide, polyacylates, polysaccharides, etc.), and various treating agents which control the physical, and/or rheological properties of drilling fluids in wellbores. The drilling fluid serves to remove chips, cuttings and the like produced by a rotating drill bit from a wellbore by circulating the drilling fluid down from the surface of the well, through the drill string, and out through openings in the drill bit such that the drilling fluid is then circulated upwardly in the annulus between the side of the wellbore and the rotating drill string.

The selection of a drilling fluid is primarily dependent upon the geological formation being drilled and the problems associated with such formation. Principal concerns in selection of a drilling fluid are low temperature drilling conditions, formation of gas hydrates, shale dispersion, and drilling fluid loss and environmental requirements. Classically, temperature concerns associated with drilling oil/gas wells have been associated with deep hot wells (>300° F.); however, for deep water and/or Arctic drilling low temperatures are a concern for two principal reasons: (1) freezing of the mud due to low temperature, especially if the well must be shut in for long durations, and (2) the formation of gas hydrates under low temperature and high pressure conditions after the influx of gas. The present invention provides a drilling fluid additive which overcomes these and other problems in the art as more particularly disclosed hereinafter.

SUMMARY OF THE INVENTION

The primary purpose of the present invention is to provide a drilling fluid, and process for the use thereof, which drilling fluid contains an additive which depresses the freezing point of the drilling fluid to allow low temperature drilling operations, inhibits formation of gas hydrates which form at low temperatures and high pressures, prevents shale dispersion which results in improved wellbore stability, reduces drilling fluid loss thereby reducing amounts of other fluid loss additives if any (e.g. gel-bentonite, carboxymethylcellulose, starch), and is environmentally safe. Accordingly, the present invention is directed to a water base drilling fluid comprising water, clay or polymer, and a sufficient amount of alcohol, partially hydrolyzed polyacrylamide and, optionally, salt necessary to reduce the freezing point of the drilling fluid to a predetermined value, inhibit the formation of gas hydrates in the drilling fluid, reduce shale dispersion from the wellbore into the drilling fluid, and reduce drilling fluid loss through the wall of the wellbore thereby reducing amounts of other fluid loss additives if any (e.g. gel-bentonite, carboxymethylcellulose, starch).

In addition, the present invention is directed to a method for drilling a well comprising rotating a drill string to cut a borehole into the earth; circulating a drilling mud through the drill string and through the annulus between the drill string and the wall of the borehole; checking the drilling fluid for evidence of any of the following problems: freezing, gas hydrate formation, shale dispersion and fluid loss; and adding alcohol, partially hydrolyzed polyacrylamide and, optionally, salt to the drilling fluid in an amount sufficient to overcome the above identified problems. Further, the present invention provides a method for drilling a well comprising determining whether the formation to be drilled will subject the drilling fluid to any of the following problems: freezing, gas hydrate formation, shale dispersion, and fluid loss; providing a drilling fluid containing alcohol, partially hydrolyzed polyacrylamide and, optionally, salt in an amount sufficient to overcome the above identified problems; rotating a drill bit to cut a borehole into the earth; and circulating the drilling fluid through a drill string and through an annulus between the drill string and the wall of the borehole.

Among the alcohols suitable for use with the present invention, cyclicetherpolyols are most preferred.

Other purposes, distinctions over the art, advantages and features of the invention will be apparent to one skilled in the art upon review of the following.

DESCRIPTION OF PREFERRED EMBODIMENTS

Figure 1:
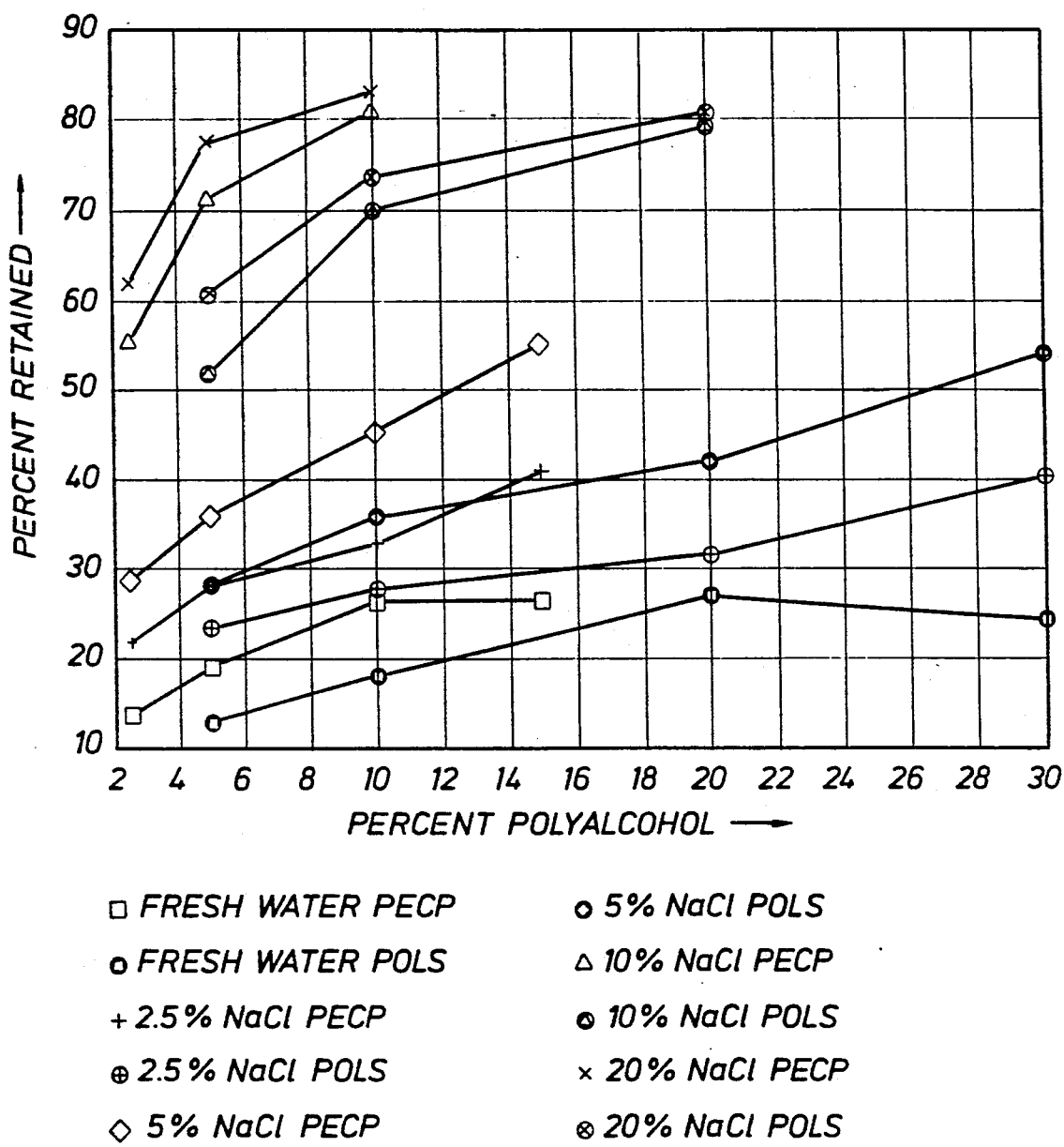
FIGS. 1-3 show a comparison of two polyalcohols employed with partially hydrolyzed polyacrylamide.

Applicants have found that the use of an alcohol such as an acyclic polyol (e.g., glycerol), a monoalicyclicpolyol, or a cyclicetherpolyol, and partially hydrolyzed polyacrylamide and, optionally, salt in an appropriate amount, to a drilling fluid substantially depresses the freezing point of the drilling fluid to eliminate problems with low temperature drilling operations, inhibits formation of gas hydrates which form at low temperatures and high pressures, reduces shale dispersion which results in improved wellbore stability, reduces drilling fluid loss thereby reducing amounts of other fluid loss additives if any (e.g. gel-bentonite, carboxymethylcellulose, starch), and is environmentally safe. Thus, according to the Applicants' method, the drill string is rotated to cut a borehole into the earth while circulating a drilling fluid down through the drill string and thence up the annulus between the drill string and the wall of the borehole. While this is occurring, a driller preferably is checking or observing the drilling fluid for evidence of the above noted problems. Alternatively, the formation may be known in advance to present certain problems, and the drilling fluid may be provided with an alcohol, partially hydrolyzed polyacrylamide and, optionally, salt in amounts sufficient to overcome these problems.

In most instances, the applicable amount of alcohol, partially hydrolyzed polyacrylamide and, optionally, salt to be added to the drilling fluid will be determined on a well-to-well basis. The applicable amount of drilling fluid additive may be established through knowledge of the formation to be drilled or, when a driller observes that the drilling fluid contains evidence of freezing, gas hydrates, shale dispersion and/or loss of fluid, then he can begin adding alcohol, partially hydrolyzed polyacrylamide and, optionally, salt or additional alcohol (e.g., glycerol), partially hydrolyzed polyacrylamide and, optionally, salt until the appropriate level of alcohol, partially hydrolyzed polyacrylamide and, optionally, salt in the drilling fluid is obtained to eliminate the above identified problems. A concentration of alcohol in the drilling fluid of from about 1 to 60, or preferably about 5 to 40 percent by weight, from about 0.001 to 1.0 weight percent partially hydrolyzed acrylamide and, optionally, from about 1 to 26, or preferably about 5 to 20 weight percent salt based on the total weight of the drilling fluid, will reduce the freezing point of the drilling fluid by about 1 to about 80 in °F. A concentration of from about 1 to about 60, or preferably by 5 to 40 percent by weight alcohol, from about 0.001 to 1.0, or preferably about 0.01 to 0.2 weight percent partially hydrolyzed polyacrylamide and, optionally, from about 1 to 26, or preferably about 5 to 20 weight percent salt, based on the total weight of the drilling fluid, will inhibit formation of gas hydrates. A concentration of from about 1 to about 50, or preferably about 2 to 30 weight percent alcohol, from about 0.001 to 1.0, or preferably about 0.01 to 0.2 weight percent partially hydrolyzed polyacrylamide and, optionally, from about 1 to 26, or preferably about 5 to 20 weight percent salt in the drilling fluid, based on the total weight of the drilling fluid, will reduce shale dispersion. A concentration of from about 1 to 60, or preferably about 5 to 30 weight percent alcohol, from about 0.001 to 1.0, or preferably about 0.01 to 0.2 weight percent partially hydrolyzed polyacrylamide and, optionally, from about 1 to 26, or preferably 5 to 15 weight percent salt in the drilling fluid, based on the total weight of the drilling fluid, will reduce fluid loss from the drilling fluid through the wall of the wellbore.

The alcohol of the present invention is preferably any water soluble alcohol within the following groupings or mixtures thereof, although any alcohol of less than 8 hydroxyl groups and less than 16 carbon atoms is suitable. Hereinafter "poly" is used to mean two or more, "mono" is used to mean one, "cyclic" is used to mean one or more rings, "ether" is used to mean one or more ether linkages, PECP will mean either of polyetherpolycyclicpolyol, or polycyclicpolyetherpolyol.

A preferred class of alcohol components of this invention are acyclic polyols. Among acyclic polyols, preferred are those having at least 3 carbon atoms and 2 hydroxyl groups but no more than 80 carbon atoms and 60 hydroxyl groups. More preferably, the acyclic polyols of the invention have at least 9 carbon atoms and 5 hydroxyl groups but no more than 50 carbon atoms and 40 hydroxyl groups.

Another preferred class of alcohol components of this invention are monoalicylicpolyols. Among monoalicylicpolyols, preferred are those having 5 to 30 carbon atoms and 2 to 10 hydroxyl groups.

A most preferred class of alcohol components of this invention are cyclicetherpolyols. Among cyclicetherpolyols, preferred are those having at least 6 carbon atoms, at least 2 hydroxyl groups, and at least 2 ether linkages, but no more than 1800 carbon atoms, 450 hydroxyl groups, and 600 ether linkages. Even more preferred are cyclicetherpolyols having at least 15 carbon atoms, 5 ether linkages, and at least 5 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages but preferably no more than 1200 carbon atoms, 300 hydroxyl groups, and 400 ether linkages. Weight average molecular weights [defined infra] for the cyclicetherpolyols preferably range from 1,000 to 30,000 and more preferably from 5,000 to 20,000. Among the cyclicetherpolyols, monocyclicdietherdiols are preferred and polycyclicpolyetherpolyols are more preferred.

Nonlimiting examples include monomers, oligomers and telomers of polyhydric alcohols (or their precursors, or combinations thereof) such as glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, 1,5,6,9-decanetetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol, and copolymers of ethylene glycol and propylene glycols with the preceding alcohols.

Cyclicetherpolyols can be obtained, for example, by extraction from saline water byproduct streams arising from the manufacture of epoxy resins, e.g., by reaction of epichlorohydrin and bisphenol A as described in U.S. Pat. Nos. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic diethers, the number of moles of water expelled must be at least equal to the number of moles of glycerol (or other polyhydric, at least trihydric, polyol) used in the reaction mixture.

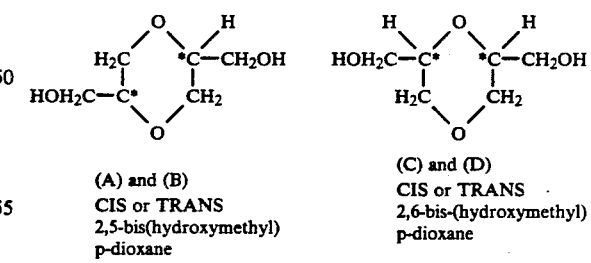

(A) and (B)
CIS or TRANS
2,5-bis(hydroxymethyl)
p-dioxane (C) and (D)
CIS or TRANS
2,6-bis-(hydroxymethyl)
p-dioxane

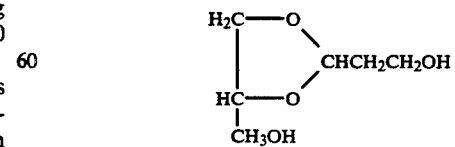

(E)
Glycerine Acetal of
Hydracrylaldehyde
(I)

In structures A through D, CIS and TRANS refer to the stereoisomerism of the carbon atoms marked by an asterisk. Structures A through D can also be called bis-hydroxymethyl 1,4-p-dioxanes.

Polycyclicpolyetherpolyols may in turn be prepared by polycondensation of compounds such as (A) through (E) supra in chemical processes which are accompanied by significant expulsion of water molecules from the polymerizing compounds. The number of ether linkages equals the number of water molecules expelled. Taking (C) or (D) supra as the building unit, the lowest molecular weight structure containing two such units is Structure (II) infra, containing two terminal hydroxyl groups, and five ether linkages. Structure (II) is formed by condensation from glycerol molecules with the expulsion of five water molecules.

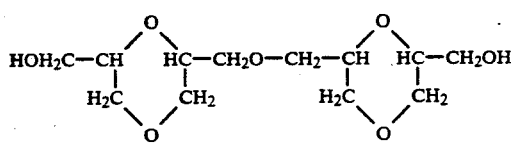
(II)

This structure is a di-cyclicpoly (or penta) etherdiol, and can be called di-bis-hydroxymethyl 1,4-p-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

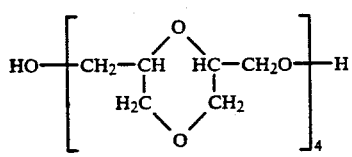
(III)

Copolycondensation of four structure (I) units with itself and with one polyhydric (at least trihydric) molecule, e.g., a glycerol molecule, can yield structure (IV) infra and its isomeric equivalents:

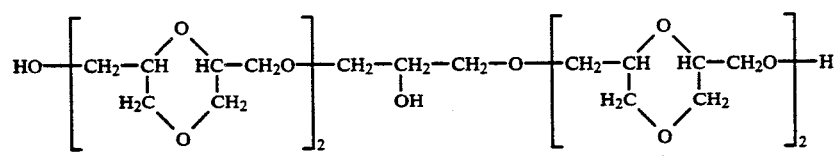
(IV)

Analgous structures can be obtained from structures (I) (A), (I) B, and (I) E supra by polycondensation. Structures based on (E) supra will have 5-membered rings. Spectroscopic techniques cannot conveniently distinguish between the 5 or 6 membered rings.

Structure (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

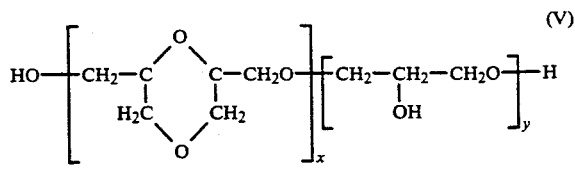
(V)

where $x \geq 1$ and $y \geq 0$.

Preparation of cyclicetherpolyols for the practice of this invention can be obtained by direct synthetic route. For example, starting with glycerol, chlorohydrin can be produced, which upon treatment with NaOH at elevated temperatures yields glycidol. This molecular structure cyclicizes at still higher temperature to yield bis hydroxymethyl 1,4-p-dioxane.

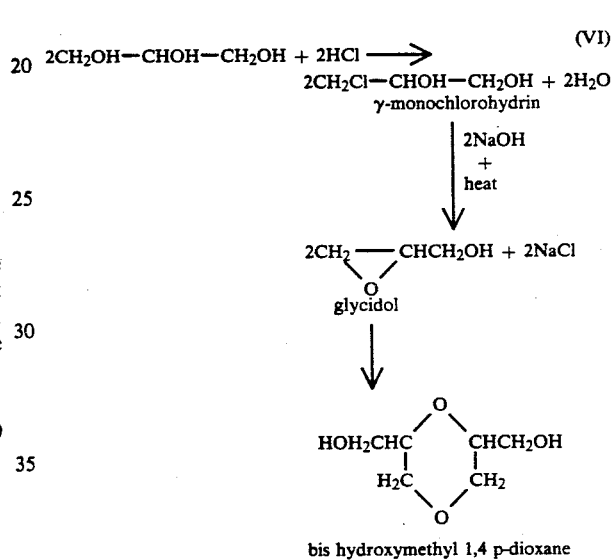
(VI)

To make the higher molecular weight components from bis hydroxymethyl-1,4-p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range from 150° C. to 350° C. can be employed with pressures ranging from subatmospheric to several atmospheres. The vapor pressure of the water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which can enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols are quite suitable. Examples are butane triols, such as 1,2,4-butanetriol, pentane triols, such as 1,2,3-pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

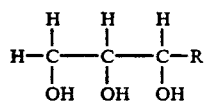

(VII)

will yield several structures, one of which is illustrated by:

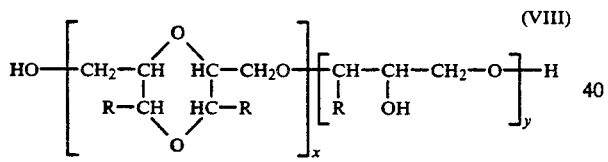

(VIII)

The R group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols can be obtained from trihydric alcohols with more than three carbons such as the following:

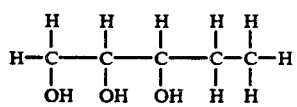

(IX)

1, 2, 3-Pentanetriol

The following monocyclicdietherdiols of pentanetriol are obtained from Structure IX in accordance with the methods described supra:

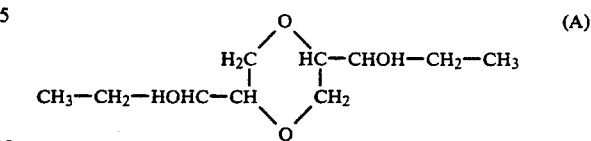

(A)

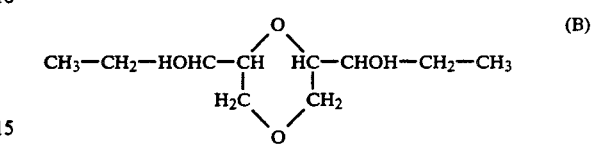

(B)

Both dimers (A) and (B) are obtained from Structure IX by reacting at carbons 1 and 2.

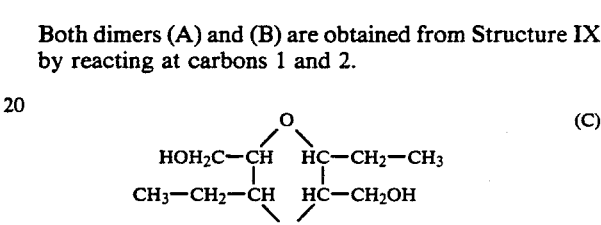

(C)

(D)

Both dimers (C) and (D) are obtained by reacting Structure (IX) at carbons 2 and 3.

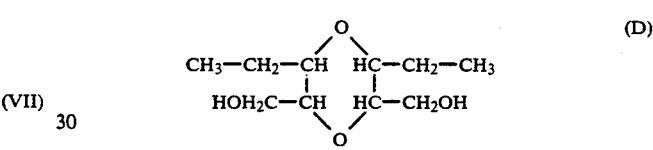

(E)

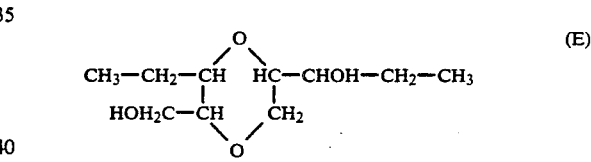

(F)

Dimers (E) and (F) are obtained from (IX) by reacting at 1,2 and at 2,3 positions.

(X)

Further polycondensation of the cyclicetherdiols supra will yield polycyclicpolyetherpolyols with structures which depend on which hydroxyl groups are involved in the condensation reaction. For instance, reaction between Structures (X) A supra and (X) F supra will yield (XI) infra, a dicyclicpentaetherdiol of pentanetriol as follows. Obviously, a large number of possible polycondensed structures exist.

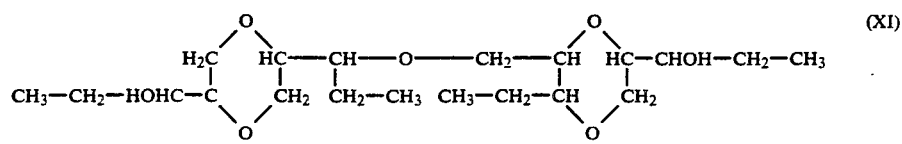

(XI)

The molecular weight of a typical composition which was found to provide excellent properties in the drilling fluid of this invention upon addition to a level of 2% w, had molecular weight parameters as determined infra. Number average molecular weight $M_n$ is shown by the following:

$$M_n = \frac{\sum_i n_i M_i}{\sum_i n_i} \geq 1230$$

Two examples of polyglycerol structures which can undergo cyclization are molecules XII and XIII below:

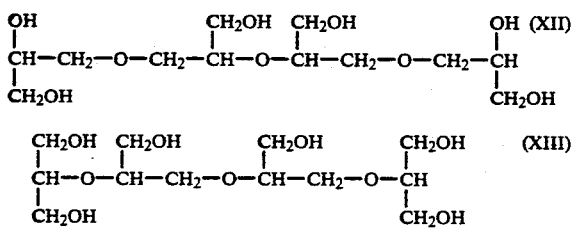

The general formula of the cyclized polyglycerols is poorer in oxygen and hydrogen than the general composition $C_{3x} O_{2x+1} H_{6x+2}$. Cyclization of XII yields XIV, and cyclization of XIII yields XV.

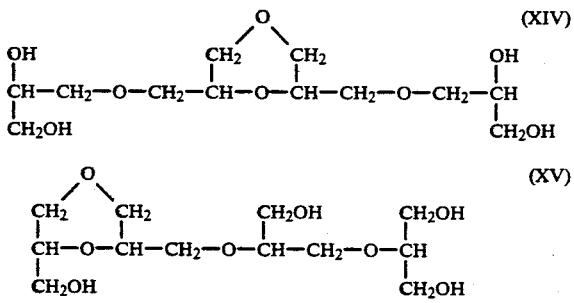

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture.

The weight average molecular weight was found to be:

$$M_w = \frac{\sum_i n_i M_i^2}{\sum_i n_i M_i} \geq 10550$$

This $M_w$ value represents GPC results expressed in terms of PEG numbers obtained by using two Ultrahydrogel columns, a 250 angstroms column and a 120 angstroms column connected in series using water as solvent at 30° C. This molecular weight, weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample on those properties which depend on the size of the individual molecules, such as effectiveness in light scattering, or ability of the molecule to penetrate into small openings. Thus, a high $M_w$ would be beneficial if penetration of the molecules into the interplanar structure of layered clays in the formulation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP.

In accordance with a highly preferred embodiment of the invention, polycyclicpolyetherpolyols having superior characteristics are produced by thermal condensation of glycerol in distillation apparatus under conditions which allow water to be removed overhead, but not substantial amounts of glycerol or its dimers or trimers. A catalyst is required, preferably an alkali metal hydroxide, more preferably sodium hydroxide, in a preferred concentration of 0.5–1.5 percent by weight of the reaction mixture, and preferably including an alkali metal acetate, more preferably sodium acetate, in like or smaller amounts.

The mixture is heated, preferably between 150 and 350 mm Hg and free water is distilled off continuously, allowing the equilibrium limited reaction to proceed further and to completion. The glycerol will then begin to rise in temperature to about 210°–230° C. at 120–180 mm Hg, at which temperature the mixture refluxes, indicating the onset of reactions which produce water by condensation of the glycerol. By maintaining the pressure at up to 180 mm Hg, the glycerol, which may volatilize along with the water, is condensed in an overhead condensor, and preferably cooled by a coolant. The glycerol and its linear and cyclic dimers which form in the course of the volatilization process, are condensed and refluxed to the reacting mixture. Gradually the procedure results in an increase in the boiling point of the mixture, brought about by the continuous removal of water of condensation and by the increase of the molecular weight of the mixture.

As the degree of polymerization increases, and the water removed from the glycerol feed increases, the pressure over the mixture is gradually decreased externally, either in a continuous, preferably gradual mode, or at selected reaction temperatures. For example, it is possible to reduce the pressure to 120 mm Hg when the mixture reaches 250° C. at a pressure of 180 mm Hg. Alternatively, it is possible to control the pressure to diminish gradually by a known mechanical means.

The preferred way to achieve extensive dehydration without undesirable crosslinking and gelation of the polycyclicpolyetherpolyols is by the addition of small amounts of glycerol, at a later stage of the reaction, for example, when the reaction medium temperature has reached 270°–280° C. at a pressure of 50–100 mm Hg, preferably 60–90 mm Hg. Upon addition of 2–6 percent by weight of glycerol, basis final weight of glycerol added, at a point after removal, for example, of 0.8 moles of water per mole of glycerol, a drop in the temperature of the reaction mixture occurs, the drop being several degrees Centigrade or Fahrenheit. The drop is caused by the lower temperature of the glycerol being added, but more importantly indicates the endothermic nature of the reaction between glycerol molecules, or between glycerol molecules and added glycerol molecules, or between added glycerol molecules with reactive sites in the polymerizing mixture. For better effectiveness, the glycerol may be presaturated with alkaline metal hydroxide, e.g., sodium hydroxide.

Upon continued input of heat from an external source, the temperature of the reacting mixture rises to the previous highest level, or to a higher level, or to a somewhat lower level than a first high temperature, depending upon the molecular weight distribution of polycyclicpolyetherpolyols in the mixture. This procedure of incremental glycerol addition can be repeated a number of times, three being a convenient number. With three additions of glycerol the experimental reaction time between onset of reaction and its completion usually takes 5-10 hours depending on the temperature and pressure of additions and the amount of glycerol added each time. As the reaction approaches 85 percent completion it is suitable to combine glycerol additions with further reductions of pressure, going down to 30 mm Hg or even lower. As the reaction approaches completion, it turns from being highly endothermic to being thermally neutral, and at a dehydration approaching and exceeding 1.2 moles of water per mole of glycerol, it can become exothermic. This is a reflection of the propensity of the mixture to undergo rapid cross-linking of the complex polycyclicpolyetherpolyol structures. In order to avoid the occurrence of such an undesirable crosslinking reaction, it is preferred to buffer the reaction by adding a small amount of glycerol, for example, 0.3-0.9 percent or up to 1.5 percent by weight total. Preferably there is added 0.5 percent by weight of glycerol at a selected time or preferably at a point where the reaction is 96 percent complete, after removal of 1.12-1.15 moles of water per mole of glycerol in the reaction medium.

It has been found that the addition of minor amounts of epoxy resins to the reaction mixture are beneficial. Preferred epoxy resins are diglycidyl ethers, triglycidyl ethers, and tetraglycidyl ethers which, in the reacting glycerol medium, result in formation of higher molecular weight polycyclicpolyetherpolyols which substantially improve properties in connection with drilling fluid performance. Polycyclicpolyetherpolyols resulting from this process are characterized by binodal molecular weight distribution, $M_w$ in excess of 50,000, said $M_w$ being determined in a three-column gel permeation chromatography, and being 0.5 to 10% w epoxy structures. The polycyclicpolyetherpolyols are further characterized by molecular structures which are no more than 20% free of associated cyclic formations.

Experimental results show that the impact of using multifunctional glycidyl ethers on the value of $M_n$ and on the performance, particularly as regards swelling of clays when the invention is used as a drilling fluid additive, is truly significant. Thus, when using 3.0% w Epon 828 (difunctional glycidyl ether) and 3.0% w Epon 1031 (tetrafunctional glycidyl ether) tradenames of Shell Oil Company, the $M_w$ values are correspondingly 78,015 and 151,000, and the swelling inhibition is the highest with Epon 1031, with good performance on fluid loss and on dispersion. The immediately preceding $M_w$ values are expressed in terms of true molecular weight in units of Daltons by using three Ultrahydrogel columns, a Linear column, a 250 angstroms column and a 120 angstroms column in series, using water as the solvent at 30° C.

Most preferred samples of polycyclicpolyetherpolyols with beneficial effects on the properties of drilling fluids have been found to have $M_n$ values in the order of about 150 to about 2000 and $M_w$ values in the order of 1500 to 12000. The $M_n$ and $M_w$ values for POLS (defined hereinafter) are 130-145 and 700-875, respectively, but POLS is superior to many other alcohols in carrying out the purposes of this invention.

A commercially available polyol mixture (herein referred to as POLS) and polyetherpolycyclicpolyols prepared by Shell Chemical Company (herein referred to as PECP) are hereinafter shown for different drilling fluid combinations. The POLS sample tested herein was analyzed to be 46.8% w propylene glycol with 16.6% w linear dimers, 17.5% w linear trimers, 3.8% w linear tetramers, 3.2% w linear pentamers, and 0.88% w linear hexamers of propylene glycol, with less than 0.5% w cyclics, 11% w water and 0.2 to 0.5% w Na+ and K+. A typical PECP sample tested was 0.16% w glycerol, 11.4% w p-dioxanes, 1.1% w cyclic trimers of glycerol, 4% w cyclic and dicyclic tetramers of glycerol, 2% w cyclic and dicyclic pentamers of glycerol, 2% w dicyclic and tricyclic hexamers of glycerol, 2% w dicyclic and tricyclic heptamers of glycerol, 3% w dicyclic and tricyclic octamers of glycerol, 4% w dicyclic and tricyclic nonamers of glycerol, 27% w polycyclicpolyetherpolyols having at least 30 carbon atoms and at least 2 cyclic ethers per molecule, 37.5% w water, and 0.5% NaCl.

Various inorganic salts are suitable for use with the invention, including but not limited to NaCl, NaBr, KCl, $CaCl_2$ and $NaNO_3$ among which NaCl is preferred. A synergistic effect is experienced when such a salt is used with the other components of the mud additive package, i.e., an effect greater than the sum of the effects from the components individually.

Partially hydrolyzed polyacrylamides suitable for use in the present invention can comprise such polymers formed by polymerizing and subsequently hydrolyzing acrylamide (or a lower homolog of acrylamide) or co-polymerizing acrylamide with an acrylate, or the like. The molecular weight of the polyacrylamide should be at least greater than about one million and is preferably greater than about three million. The range of hydrolysis (and/or the proportion of the amide groups of the polyacrylamide that are carboxyl groups or have been hydrolyzed to form carboxyl groups) should be from about 20 to 50 percent and extents of hydrolysis of from about 30 to 40 percent are particularly suitable.

Drilling fluid properties should be such as to promote safe and speedy drilling and completion of the well with the maximum productive capacity. Use of drilling fluids of controlled properties requires expenditure of large sums of money, and to carry out its role properly, the drilling fluid must be protected against the effects of freezing conditions, gas hydrate formation, shale dispersion and fluid loss. The use of alcohol (e.g., glycerol), partially hydrolyzed polyacrylamide and, optionally, salt readily protects the drilling fluid against freezing conditions and gas hydrate formation by lowering the freezing point of the drilling fluid. With respect to shale dispersion and fluid loss, the use of alcohol, and optionally, partially hydrolyzed polyacrylamide and/or salt aids in deposition of an impermeable filter cake, and the filter cake in turn prevents fluid loss and shale dispersion. The filter cake performs its job primarily on the basis of its impermeability to water. If the formation permeability and the fluid-loss properties of the mud are both high, large quantities of fluid will flow through the wall cake and into the permeable formation, leaving a thick wall cake behind. This cake may become so thick as to seriously interfere with movement of the drill pipe when it is withdrawn and may even result in sticking the pipe. If a thick cake is formed over the face of the producing formation, it may not become properly cleaned off during the well completion process and will interfere with the production rate of the well. The fluid which passes into the formation may also exercise an influence. When the drilling fluid is water base and shales and clays which are susceptible to hydration are drilled, the use of high fluid loss drilling fluid may result in swelling and heaving of the shale, slow drilling rates, stuck pipe, fishing jobs and even loss of the hole. If the producing formation contains hydratable clays, the intrusion of water may result in swelling of the clay particles within the sandy formation and permanent loss of permeability with resulting impaired production rates. Alcohol, and optionally, partially hydrolyzed polyacrylamide and/or salt readily solves such problems by increasing the impermeability of the filter cake to water and thus decreasing the fluid-loss properties of the drilling fluid.

The following examples are illustrative of the application of the process of the present invention and of the drilling fluid composition, and are not to be construed as limiting the scope thereof.

In Table 1 and 1A, the effectiveness of the combination of glycerol and partially hydrolyzed polyacrylamide (PHPA) is demonstrated. From the data it is clear that the combination of the PHPA and glycerol provide a substantial amount of inhibition of cuttings dispersion. If the percent retained from the 5% glycerol minus fresh water (control) is added to the percent retained (minus fresh water, control) observed in the presence of PHPA, the predicted values for an additive relationship can be predicted. The fact that the combination of the two additives (glycerol and PHPA) is superior to the sum of the individual additives when tested alone, indicates synergy. This provides a unique application of alcohols in drilling fluids since it provides a cost effective means, without altering the mud properties adversely, to improve the stabilization of cuttings and thus the wellbore. Fresh water samples without PHPA were supplemented with XC polymer (see footnote of Table 1A); the effect of the XC polymer on the dispersiveness of cuttings was not significant. XC polymer was added to ensure that viscosity differences were minimized.

In Table 2 a confirmation of the observations made in Table 1 is shown. For Pierre shales, under the conditions of testing after 172 hours, no shale remains when tested in fresh water. However, in the presence of salt, partially hydrolyzed polyacrylamide (PHPA), and glycerol the cuttings dispersion rate is slowed to such a rate that for the first 172 hours it is comparable to oil and only slightly decreased after 350 hours. At 1000 hours it is clear that the addition of alcohol offers a significant improvement with PECP being better than W-80 TM (a trade name of Dow Chemical Company for polyglycerol), POLS or glycerol. This offers a significant advantage to maintaining the drilling fluid properties since solids control equipment will work more efficiently and since the wellbore will have greater stability.

The fact that the salt/PHPA alcohol combination exceeds the effectiveness of the individual components (salt, alcohol, PHPA) added together to stabilize the cuttings indicates that the interaction between the PHPA and/or salt and polyalcohol is synergistic (Table 2).

In Table 3 results from hot rolling are shown which demonstrate the synergy between salt, PHPA, and PECP. For two different salt concentrations the PHPA and PECP concentrations are varied. When the sum of the fresh water+alcohol, fresh water+NaCl, and the fresh water+PHPA at the appropriate concentration is exceeded, synergy can be inferred. As shown in Table 3 the sum is always exceeded for the concentrations tested. From the results it is clear that there is synergy between the salt/PECP combination, salt/PHPA combination, and the salt/PHPA/PECP combination. This result was not anticipated and suggests that reduced amounts of salt and/or PHPA can be used if PECP is added. This has the potential of being not only an improvement in performance of the system but also potentially a means to lower costs.

Figure 2:
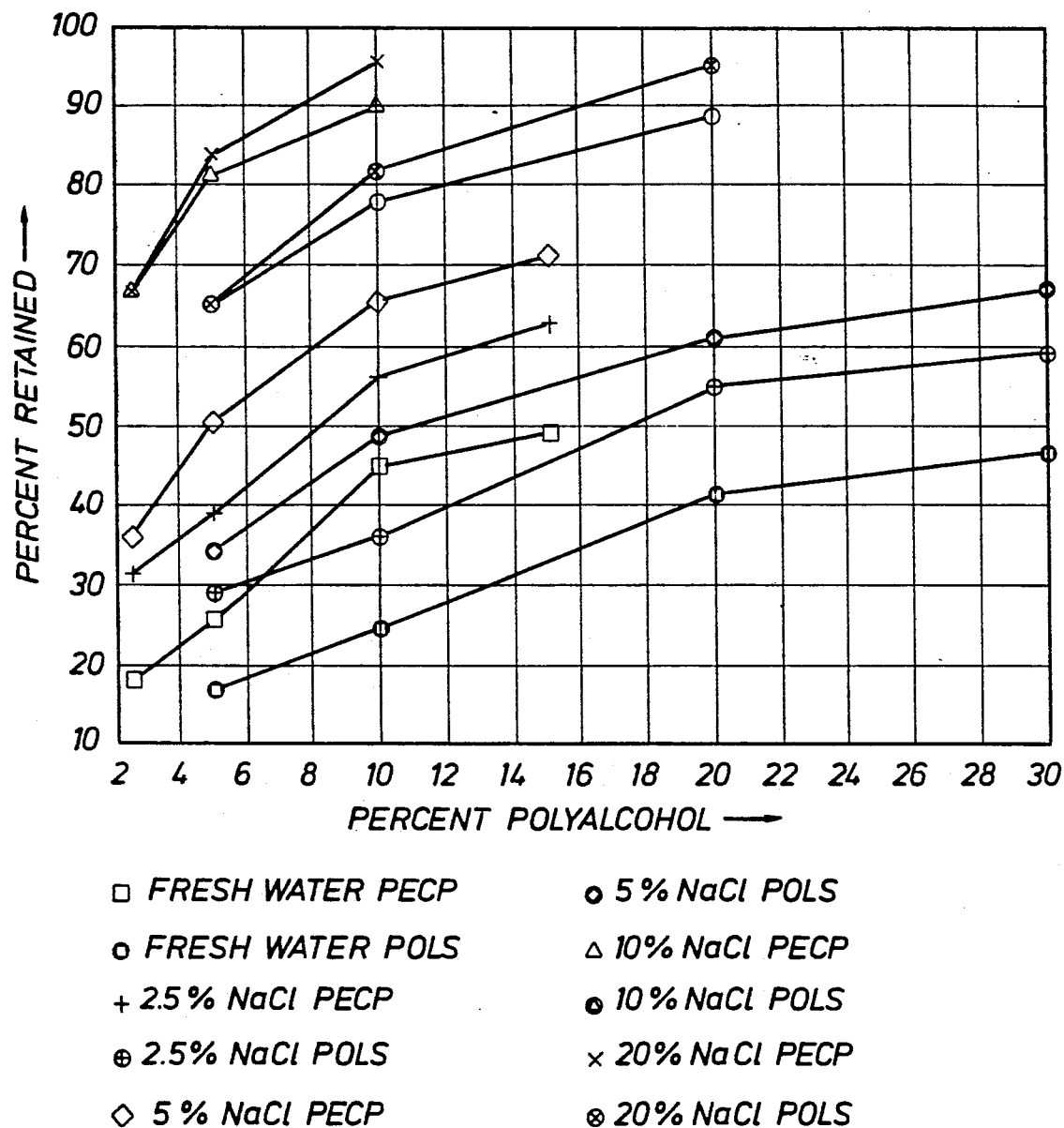
Figure 3:
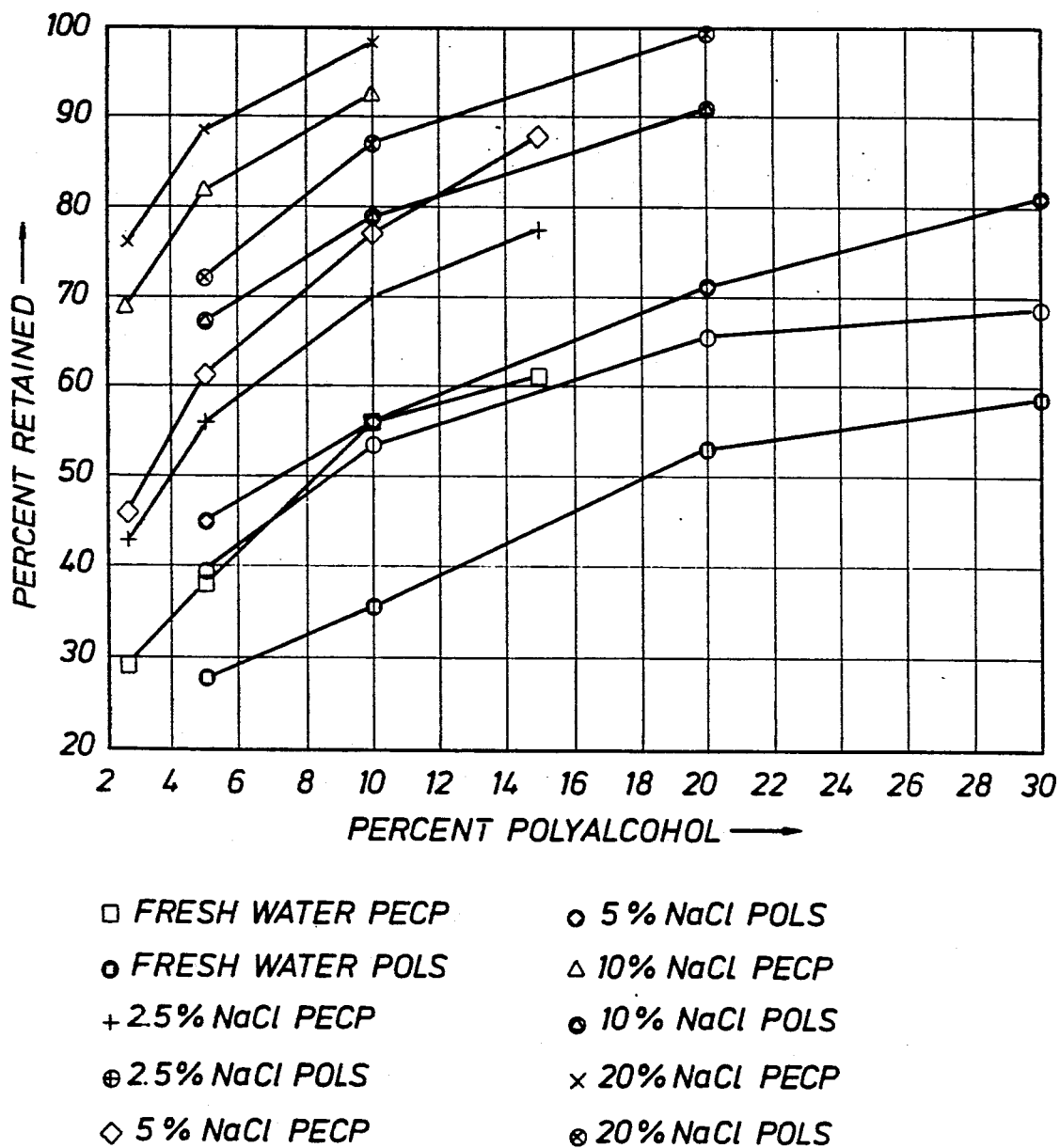

In FIGS. 1-3, Grover 11521 feet, shale was hot rolled at 150° F. in different test solutions at different levels of NaCl and PHPA (FIG. 1, 0.05 lb/bbl PHPA; FIG. 2, 0.1 lb/bbl PHPA; and FIG. 3, 0.25 lb/bbl PHPA) and polyalcohols. The fresh water samples were hot rolled for 0.00415 hours, the 2.5% w NaCl solution for 5.5 hours, the 5% w NaCl solutions for 13 hours, the 10% w NaCl for 50 hours, and the 20% w NaCl for 132 hours with either PECP or POLS at different concentrations. What the results demonstrate is that PECP is substantially superior to the POLS material and that reduced amounts of PHPA are required with increases in salt and/or polyalcohol.

In Table 4 mud formulations using glycerol in combination with PHPA are shown. The results indicate that a formulation can be developed which provides good rheologies with adequate fluid loss control. In fact, the addition of glycerol typically improves fluid loss properties and filter cake quality. In addition, shale stability data (hot rolling dispersion test) indicates a substantial improvement in cuttings stability when glycerol is present in the mud formulation.

In Table 5 mud formulations are shown with POLS and PECP which indicate that reasonable mud properties can be obtained in the presence of either polyalcohol. The point of interest is that with the addition of either POLS or PECP reduced amounts of XC polymer (viscosifier) or carboxymethylcellulose (fluid loss additive) can be used with reasonable fluid loss and rheological properties resulting. This is most apparent with the HPHT results in which the fluid loss control obtained at a lower concentration of carboxymethylcellulose (CMC) and with PECP or POLS was good or better than that obtained at the 1.0 lb/bbl CMC without PECP or POLS. The PECP can be considered more effective since it takes less to obtain an equivalent or superior reduction in fluid loss relative to POLS. This is most evident when the HPHT results are considered.

TABLE 1

Synergy Between PHPA[2] and Glycerol
Pierre

| | Experimental | Experimental Minus Fresh Water | Predicted PHPA + Glycerol Minus Fresh Water |
|---|---|---|---|
| | Percent Retained | | |
| Fresh Water | 4.4 | | |
| FW[1]/5% w Glycerol | 6.4 | 2 | |
| .007 gm PHPA[2]/100 ml H$_2$O | 41.6 | 37.2 | |
| .014 gm PHPA/100 ml H$_2$O | 47.2 | 42.8 | |
| .007 gm PHPA/100 ml H$_2$O/5% w Glycerol | 60.4 | 56 | 39.2 |
| .014 gm PHPA/100 ml H$_2$O/5% w Glycerol | 82.8 | 78.4 | 44.8 |

Above samples were hot rolled at 150° F. for 48 hours.
[1]Fresh Water
[2]Partially hydrolyzed polyacrylamide

TABLE 1A

Synergy with PHPA[1] and Glycerol
Green Canyon 12535 feet

| | Experimental | Experimental Minus Fresh Water | Predicted PHPA + Glycerol Minus Fresh Water |
|---|---|---|---|
| | Percent Retained | | |
| Fresh Water | 1.6 | 0 | |
| PHPA[1] | 23.2 | 21.6 | |
| .0143 gm/100 ml PHPA H$_2$O/Glycerol 5% w | 48.8 | 47.2 | 22.4 |
| Glycerol 5% w/FW | 2.4 | 0.8 | |

[1]Partially hydrolyzed polyacrylamide
Fresh water (FW) samples without PHPA were supplemented with XC polymer (0.2 lb/bbl) for viscosity control. XC is a water soluble polymer including polysacharides, as sold under the trade name "Kelzan XC" by Kelco Corp. Fresh Water (FW) sample without XC polymer had a percent retained of 1.3.
Above samples were hot rolled at 150° F. for 1.0 hours.

Pierre shale of Green Canyon 12535 shale sized to between 6 to 10 mesh were added to the test solutions (2.5 gm) and hot rolled for the indicated amount of time at 150° F. The shale/test solutions were screened over 10, 30 and 80 mesh screens. The shale retained was dried and weighed. The data are expressed as percent retained of the original weight (2.5 gm). In order to evaluate synergy the percent retained in partially hydrolyzed polyacrylamide (PHPA) fresh water (minus the percent retained in just fresh water) was added to the percent retained in glycerol fresh water (minus the percent retained in just fresh water). This was compared to the experimental result when the PHPA and the glycerol were used in combination. If the experimental percent retained (minus fresh water) was greater than the predicted percent retained (minus fresh water) then synergy was evident.

TABLE 2

Pierre Shale Dispersion in NaCl/PHPA/Polyalcohol

| | 172 Hours | | 350 Hours | | 1000 Hours | |
|---|---|---|---|---|---|---|
| | Percent Retained | | | | | |
| | Experimental | [1]Predicted Sum | Experimental | [1]Predicted Sum | Experimental | [1]Predicted Sum |
| Fresh Water (FW) | 0 | — | 0 | — | 0 | — |
| FW/10% w Glycerol | 0 | — | 0 | — | 0 | — |
| FW/10% w POLS | 0 | — | 0 | — | 0 | — |
| FW/5% POLS | 0 | — | 0 | — | 0 | — |
| FW/10% W 80 ™ | 0 | — | 0 | — | 0 | — |
| FW/PHPA | 16.5 | — | 3.9 | — | 0 | — |
| Oil (Diesel) | 97.6 | — | 96.5 | — | 93.5 | — |
| 20% w NaCl | 11.3 | — | 2.5 | — | 0 | — |
| 20% w NaCl/PHPA | 81.2 | — | 74.2 | — | 22.5 | — |
| 20% w NaCl/10% w Glycerol | 18.3 | — | 3.7 | — | 0 | — |
| 20% w NaCl/10% w POLS | 21.2 | — | 6.2 | — | 0 | — |
| 20% w NaCl/10% w W 80 | 23.4 | — | 8.7 | — | 0 | — |
| 20% w NaCl/5% w PECP | 25.7 | — | 11.7 | — | 0 | — |
| 20% w NaCl/PHPA/ 10% w Glycerol | 95.7 | 27.8 | 84.3 | 6.4 | 62.1 | 0 |
| 20% w NaCl/PHPA/ | 96.5 | 27.8 | 91.2 | 6.4 | 75.1 | 0 |

TABLE 2-continued

| | Pierre Shale Dispersion in NaCl/PHPA/Polyalcohol | | | | | |
|---|---|---|---|---|---|---|
| | 172 Hours | | 350 Hours | | 1000 Hours | |
| | Percent Retained | | | | | |
| | Experimental | [1]Predicted Sum | Experimental | [1]Predicted Sum | Experimental | [1]Predicted Sum |
| 10% w POLS | | | | | | |
| 20% w NaCl/PHPA/ 10% w W 80 | 97.0 | 27.8 | 93.1 | 6.4 | 80.2 | 0 |
| 20% w NaCl/PHPA/ 5% w PECP | 97.8 | 27.8 | 93.2 | 6.4 | 88.7 | 0 |

All solutions were at pH 10.0 and hot rolled at 150° F.
[1]Predicted is the sum of the percent retained in 20% Nacl, Fresh Water/PHPA and Fresh Water/Polyalcohol.

The dispersion test shown in Table 2 was done by taking sized shale (6-10 mesh) and hot rolling the shale/test solution for the indicated amount of time at 150° F. The shale/test solution was then screened over 10, 30 and 80 mesh screens. The retained shale was dried and weighed. The data are expressed as percent retained of the original shale weight (2.5 gm). PHPA was tested at 0.15 lb/bbl. The percent glycerol is expressed as percent by volume.

TABLE 3

Dose Response of PHPA, Salt, and PECP
(Grover 11,521 Feet)

| Additive | | | | Synergy Analysis | |
|---|---|---|---|---|---|
| Salt (% w) | PECP (% w) | PHPA (lb/bbl) | Experimental | Sum of Components | Difference Between* Sum and Experimental |
| | | | ←Percent Retained→ | | |
| Experiment I - Fresh Water | | | | | |
| 0 | 0 | 0 | 0 | | |
| 0 | 2.5 | 0 | 0 | | |
| 0 | 5 | 0 | 0 | | |
| 0 | 10 | 0 | 5 | | |
| 0 | 15 | 0 | 6.9 | | |
| 0 | 0 | 0.05 | 10.5 | | |
| 0 | 0 | 0.1 | 15.6 | | |
| 0 | 0 | 0.25 | 25.8 | | |
| 0 | 2.5 | 0.05 | 13.5 | 10.5 | 3 |
| 0 | 2.5 | 0.1 | 17.9 | 15.6 | 2.3 |
| 0 | 2.5 | 0.25 | 28.9 | 25.8 | 3.1 |
| 0 | 5 | 0.05 | 18.9 | 10.5 | 8.4 |
| 0 | 5 | 0.1 | 25.4 | 15.6 | 9.8 |
| 0 | 5 | 0.25 | 38.5 | 25.8 | 12.7 |
| 0 | 10 | 0.05 | 26.7 | 15.5 | 11.2 |
| 0 | 10 | 0.1 | 45.1 | 20.6 | 24.5 |
| 0 | 10 | 0.25 | 55.9 | 30.8 | 25.1 |
| 0 | 15 | 0.05 | 26.5 | 17.4 | 9.1 |
| 0 | 15 | 0.1 | 48.9 | 22.5 | 26.4 |
| 0 | 15 | 0.25 | 61.2 | 32.7 | 28.5 |
| Experiment II - 5% NaCl | | | | | |
| 0 | 0 | 0 | 0 | | |
| 0 | 2.5 | 0 | 0 | | |
| 0 | 5.0 | 0 | 0 | | |
| 0 | 10.0 | 0 | 0 | | |
| 0 | 15.0 | 0 | 0 | | |
| 0 | 0 | 0.05 | 0.2 | | |
| 0 | 0 | 0.10 | 1.0 | | |
| 0 | 0 | 0.25 | 2.2 | | |
| 5 | 0 | 0 | 5.5 | | |
| 5 | 2.5 | 0 | 7.8 | | |
| 5 | 5.0 | 0 | 21.3 | | |
| 5 | 10.0 | 0 | 31.3 | | |
| 5 | 15.0 | 0 | 35.6 | | |
| 5 | 0 | 0.05 | 13.9 | | |
| 5 | 0 | 0.10 | 22.8 | | |
| 5 | 0 | 0.25 | 28.4 | | |
| 5 | 2.5 | 0.05 | 28.7 | 5.7 | 23.0 |
| 5 | 2.5 | 0.10 | 35.9 | 6.5 | 29.4 |
| 5 | 2.5 | 0.25 | 45.8 | 7.7 | 38.1 |
| 5 | 5.0 | 0.05 | 36.0 | 5.7 | 30.3 |
| 5 | 5.0 | 0.10 | 50.1 | 6.5 | 43.6 |
| 5 | 5.0 | 0.25 | 61.2 | 7.7 | 53.5 |
| 5 | 10.0 | 0.05 | 45.2 | 5.7 | 39.5 |
| 5 | 10.0 | 0.10 | 65.2 | 6.5 | 58.7 |
| 5 | 10.0 | 0.25 | 76.9 | 7.7 | 69.2 |
| 5 | 15.0 | 0.05 | 55.1 | 5.7 | 49.4 |
| 5 | 15.0 | 0.10 | 71.0 | 6.5 | 64.5 |
| 5 | 15.0 | 0.25 | 87.9 | 7.7 | 80.2 |
| Experiment III - 20% NaCl | | | | | |
| 0 | 0 | 0 | 0 | | |
| 0 | 2.5 | 0 | 0 | | |
| 0 | 5.0 | 0 | 0 | | |
| 0 | 10.0 | 0 | 0 | | |
| 0 | 0 | 0.05 | 0 | | |
| 0 | 0 | 0.10 | 0 | | |
| 0 | 0 | 0.25 | 0 | | |
| 20 | 0 | 0 | 3.0 | | |
| 20 | 2.5 | 0 | 4.9 | | |
| 20 | 5.0 | 0 | 15.2 | | |
| 20 | 10.0 | 0 | 19.9 | | |
| 20 | 0 | 0.05 | 16.5 | | |
| 20 | 0 | 0.10 | 28.9 | | |
| 20 | 0 | 0.25 | 45.9 | | |
| 20 | 2.5 | 0.05 | 61.2 | 3.0 | 58.2 |
| 20 | 2.5 | 0.10 | 66.2 | 3.0 | 63.2 |
| 20 | 2.5 | 0.25 | 75.9 | 3.0 | 72.9 |
| 20 | 5.0 | 0.05 | 77.4 | 3.0 | 74.4 |
| 20 | 5.0 | 0.10 | 83.7 | 3.0 | 80.7 |
| 20 | 5.0 | 0.25 | 88.7 | 3.0 | 85.7 |
| 20 | 10.0 | 0.05 | 82.5 | 3.0 | 79.5 |
| 20 | 10.0 | 0.10 | 95.4 | 3.0 | 92.4 |
| 20 | 10.0 | 0.25 | 98.5 | 3.0 | 95.5 |

*Positive number implies synergy.
Samples were hot rolled at 150° F. Fresh water was hot rolled for 0.00415 hours. 5% w NaCl was hot rolled for 13 hours. 20% w NaCl was hot rolled for 132 hours.

TABLE 4

| | Mud Formulations with Glycerol | | | | | | | | | |
|---|---|---|---|---|---|---|---|---|---|---|
| | Control | 1 | 2 | 3 | 4 | 5 | 6 | 7 | 8 | 9 |
| Water (ml) | 284 | 186 | 186 | 186 | 186 | 186 | 226 | 226 | 186 | 186 |

TABLE 4-continued

Mud Formulations with Glycerol

| | Control | 1 | 2 | 3 | 4 | 5 | 6 | 7 | 8 | 9 |
|---|---|---|---|---|---|---|---|---|---|---|
| XC[1] Polymer (gm) | 0.5 | 0.5 | 0.5 | 0.5 | 0.5 | 0.5 | 1 | 1 | 1 | 1 |
| CMC[2] low viscosity (gm) | 1 | 0.5 | 0.25 | 0.5 | 1 | 1 | 0.5 | 0.5 | 0.5 | 0.5 |
| Starch (gm) | 4 | 4 | 4 | 4 | 4 | 4 | 6 | 6 | 6 | 6 |
| Partially Hydrolyzed Polyacrylamide (gm) | 0.5 | 0.25 | 0.5 | 0.5 | 0.25 | 0.5 | 0.25 | 0.25 | 0.25 | 0.25 |
| NaCl (gm) | 71 | 46 | 46 | 46 | 46 | 46 | 56 | 56 | 46 | 46 |
| Glycerol (gm) | 0 | 53 | 53 | 53 | 123 | 123 | 53 | 53 | 123 | 123 |
| Barite (gm) | 277 | 264 | 264 | 264 | 255 | 255 | 264 | 264 | 255 | 255 |
| Density (ppg) | 14 | 14 | 14 | 14 | 14 | 14 | 14 | 14 | 14 | 14 |
| Rev Dust (gm) | 35 | 35 | 35 | 35 | 35 | 35 | 35 | 35 | 35 | 35 |
| pH 9.0 with NaOH | | | | | | | | | | |
| Rheology 120° F. | | | | | | | | | | |
| 600 RPM[3] | 63 | 97 | 94 | 111 | 80 | 90 | 112 | 113 | 120 | 121 |
| 300 RPM | 40 | 58 | 54 | 69 | 46 | 62 | 71 | 70 | 72 | 73 |
| 200 RPM | 32 | 43 | 42 | 50 | 35 | 38 | 52 | 51 | 55 | 55 |
| 100 RPM | 20 | 27 | 27 | 32 | 19 | 21 | 32 | 33 | 35 | 36 |
| 6 RPM | 5 | 5 | 5 | 6 | 5 | 6 | 6 | 5 | 8 | 9 |
| 3 RPM | 3 | 4 | 3 | 4 | 3 | 4 | 4 | 4 | 6 | 6 |
| Gel 10 second (lb/100 Ft²) | 3 | 3 | 4 | 4 | 2 | 3 | 3 | 3 | 4 | 4 |
| Gel 10 minute (lb/100 Ft²) | 9 | 7 | 8 | 8 | 9 | 8 | 8 | 8 | 11 | 11 |
| Apparent Viscosity (cps) | 32 | 49 | 47 | 56 | 40 | 45 | 56 | 57 | 60 | 61 |
| Plastic Viscosity (cps) | 23 | 39 | 40 | 42 | 34 | 28 | 41 | 43 | 48 | 48 |
| Yield Point (lb/100 Ft2) | 17 | 19 | 14 | 27 | 12 | 34 | 30 | 27 | 24 | 25 |
| Settling (24 hr) | +— | — | +— | — | +— | — | — | — | — | — |
| API[4] Fluid Loss (ml) | 12.5 | 3.4 | 4 | 4.5 | 3.4 | 4.4 | 3 | 2.5 | 3.5 | 3 |
| Cake Thickness (inches) | 6 | 2 | 2 | 2 | 2 | 2 | 2 | 2 | 2 | 2 |
| High Pressure High Temperature 200° F. (ml) | 25.2 | 14.8 | 14.8 | 11.8 | 9.5 | 10.8 | 8 | 8.5 | 11.2 | 10.5 |
| Cake Thickness (32's inches) | 10 | 6 | 6 | 4 | 5 | 6 | 4 | 4 | 4 | 4 |
| Shale Stability[5] Pierre Shale (96 hr) | 41.2 | 78.3 | 79.5 | 82.5 | 77.6 | 75.3 | 83.5 | 85.3 | 81.2 | 82.3 |

[1]XC Polymer is a water soluble polymer including polysaccharides as sold under the trade name "Kelzan XC" by Kelco Corporation.
[2]Carboxymethylcellulose
[3]Apparent viscosity, plastic viscosity, yield point and gel strengths were determined with a Fann 35A following the procedures outline in API Rp 13B (Standard Procedure for Field Testing Drilling Fluids).
[4]Test for fluid loss using the API fluid loss test described in Standard Procedures of Field Testing Drilling Fluid (RP 13B). Test for fluid loss or the High Pressure High Temperature (HPHT) fluid loss test is described in the Standard Procedures of Field Testing Drilling Fluid (RP 13B).
[5]Hot Rolling Dispersion test was done at 150° F. The data is expressed as percent retained.

TABLE 5

Mud Formulations

| | Initial Mud Formulation | | | | Reduced XC Polymer | | | | Reduced PAC | | | |
|---|---|---|---|---|---|---|---|---|---|---|---|---|
| Formulation | 1 | 2 | 3 | 4 | 5 | 6 | 7 | 8 | 9 | 10 | 11 | 12 |
| Percent HF 100 | 0 | 10 | 20 | 30 | 0 | 10 | 20 | 30 | 0 | 10 | 20 | 30 |
| Seawater (ml) | 294.6 | 265.1 | 235.6 | 206.2 | 294.6 | 265.1 | 235.6 | 206.2 | 294.6 | 265.1 | 235.6 | 206.2 |
| Bentonite (g) | 10 | 10 | 10 | 10 | 10 | 10 | 10 | 10 | 10 | 10 | 10 | 10 |
| PHPA (g) | 0.5 | 0.5 | 0.5 | 0.5 | 0.5 | 0.5 | 0.5 | 0.5 | 0.5 | 0.5 | 0.5 | 0.5 |
| CMC (g) | 1 | 1 | 1 | 1 | 1 | 1 | 1 | 1 | 0.5 | 0.5 | 0.5 | 0.5 |
| XC Polymer (g) | 0.5 | 0.5 | 0.5 | 0.5 | 0.25 | 0.25 | 0.25 | 0.25 | 0.5 | 0.5 | 0.5 | 0.5 |
| Barite (g) | 152.1 | 144.7 | 137.3 | 129.8 | 152.1 | 144.7 | 137.3 | 129.8 | 152.1 | 144.7 | 137.3 | 129.8 |
| Rev Dust (g) | 40 | 40 | 40 | 40 | 40 | 40 | 40 | 40 | 40 | 40 | 40 | 40 |
| POLS (ml) | 0 | 35.7 | 58.9 | 88.4 | 0 | 35.7 | 58.9 | 88.4 | 0 | 35.7 | 58.9 | 88.4 |
| NaOH (pH 10.0)** | | | | | | | | | | | | |
| 600 rpm | 69 | 111 | 121 | 135 | 59 | 72 | 77 | 82 | 65 | 78 | 82 | 86 |
| 300 rpm | 48 | 76 | 84 | 91 | 41 | 49 | 53 | 56 | 44 | 53 | 56 | 59 |
| Plastic Viscosity (cp) | 21 | 35 | 37 | 44 | 18 | 23 | 24 | 26 | 21 | 25 | 26 | 27 |
| Yield Point (lb/100 ft²) | 27 | 41 | 47 | 47 | 23 | 26 | 29 | 30 | 23 | 28 | 30 | 32 |
| Gel Strength | | | | | | | | | | | | |
| 10-second (lb/100 ft²) | 7 | 11 | 10 | 10 | 5 | 8 | 7 | 7 | 6 | 9 | 11 | 11 |
| 10-minute (lb/100 ft²) | 11 | 18 | 12 | 15 | 6 | 13 | 12 | 13 | 9 | 13 | 14 | 13 |
| API Fluid Loss (ml) | 11.5 | 10.8 | 8.3 | 8 | 11.4 | 10.4 | 8.1 | 7.8 | 15.3 | 11.8 | 12 | 11.7 |
| HPHT 200° F. (ml) | 44.3 | 34.2 | 28.6 | 27.1 | 43.7 | 33.4 | 27.6 | 26.1 | 58.1 | 45.8 | 40.1 | 38.4 |
| Percent Improvement | | | | | | | | | | | | |
| API Fluid Loss (%) | | 6.09 | 27.83 | 30.43 | 0.87 | 9.57 | 29.57 | 32.17 | −33.04 | −2.61 | −4.35 | −1.74 |
| HPHT 200° F. (%) | | 22.80 | 35.44 | 38.83 | 1.35 | 24.60 | 37.70 | 41.08 | −31.15 | −3.39 | 9.48 | 13.32 |
| Percent Polyglycerol | 0 | 5 | 10 | 20 | 0 | 5 | 10 | 20 | 0 | 5 | 10 | 20 |
| Seawater (ml) | 294.6 | 265.1 | 235.6 | 206.2 | 294.6 | 265.1 | 235.6 | 206.2 | 294.6 | 265.1 | 235.6 | 206.2 |
| Bentonite (g) | 10 | 10 | 10 | 10 | 10 | 10 | 10 | 10 | 10 | 10 | 10 | 10 |
| PHPA (g) | 0.5 | 0.5 | 0.5 | 0.5 | 0.5 | 0.5 | 0.5 | 0.5 | 0.5 | 0.5 | 0.5 | 0.5 |
| CMC (g) | 1 | 1 | 1 | 1 | 1 | 1 | 1 | 1 | 0.5 | 0.5 | 0.5 | 0.5 |
| XC Polymer (g) | 0.5 | 0.5 | 0.5 | 0.5 | 0.25 | 0.25 | 0.25 | 0.25 | 0.5 | 0.5 | 0.5 | 0.5 |
| Barite (g) | 152.1 | 144.7 | 137.3 | 129.8 | 152.1 | 144.7 | 137.3 | 129.8 | 152.1 | 144.7 | 137.3 | 129.8 |
| Rev Dust (g) | 40 | 40 | 40 | 40 | 40 | 40 | 40 | 40 | 40 | 40 | 40 | 40 |
| PECP (ml) | 0 | 36 | 59 | 89 | 0 | 36 | 59 | 89 | 0 | 36 | 59 | 89 |
| NaOH (pH 10.0)** | | | | | | | | | | | | |
| 600 rpm | 69 | 108 | 117 | 131 | 59 | 77 | 82 | 87 | 65 | 82 | 88 | 91 |
| 300 rpm | 48 | 72 | 83 | 88 | 41 | 52 | 55 | 59 | 44 | 55 | 60 | 62 |

TABLE 5-continued

| Formulation | Mud Formulations | | | | | | | | | | | |
|---|---|---|---|---|---|---|---|---|---|---|---|---|
| | Initial Mud Formulation | | | | Reduced XC Polymer | | | | Reduced PAC | | | |
| | 1 | 2 | 3 | 4 | 5 | 6 | 7 | 8 | 9 | 10 | 11 | 12 |
| Plastic Viscosity (cp) | 21 | 36 | 34 | 43 | 18 | 25 | 27 | 28 | 21 | 27 | 28 | 29 |
| Yield Point (lb/100 ft$^2$) | 27 | 36 | 49 | 45 | 23 | 27 | 28 | 31 | 23 | 28 | 32 | 33 |
| Gel Strength | | | | | | | | | | | | |
| 10-second (lb/100 ft$^2$) | 7 | 10 | 11 | 12 | 5 | 8 | 8 | 7 | 6 | 11 | 12 | 11 |
| 10-minute (lb/100 ft$^2$) | 11 | 18 | 17 | 16 | 6 | 12 | 11 | 13 | 9 | 14 | 15 | 14 |
| API Fluid Loss (ml) | 11.5 | 8.5 | 7.8 | 7.5 | 11.4 | 8.6 | 7.5 | 7.2 | 15.3 | 9.5 | 9 | 8.4 |
| HPHT 200° F. (ml) | 44.3 | 31 | 27.4 | 24 | 43.7 | 30.8 | 26.4 | 22 | 58.1 | 38.4 | 31.2 | 28.7 |
| Percent Change | | | | | | | | | | | | |
| API Fluid Loss (%) | | 26.09 | 32.17 | 34.78 | 0.87 | 25.22 | 34.78 | 37.39 | −33.04 | 17.39 | 21.74 | 26.96 |
| HPHT 200° F. (%) | | 30.02 | 38.15 | 45.82 | 1.35 | 30.47 | 40.41 | 50.34 | −31.15 | 13.32 | 29.57 | 35.21 |

**NaOH was added to a final pH of 10.0
Percent Improvement is relative to zero percent alcohol, Formulation 1.
CMC - Carboxymethylcellulose
PHPA - Partially hydrolyzed polyacrylamide

TABLE 6

Freezing Point Depression Data

| Alcohol Solution % | Experimental Data | | | | | | Curve Fit Data | | |
|---|---|---|---|---|---|---|---|---|---|
| | PECP % | Glycerol % | POLS % | PECP °F. | Glycerol °F. | POLS °F. | PECP °F. | Glycerol °F. | POLS °F. |
| 0 | 0 | 0 | 0 | 32 | 32 | 32 | 30.9 | 32.8 | 33.0 |
| 10 | 6.3 | 10 | 8.8 | 30 | 27.5 | 29.35 | 29.4 | 27.9 | 29.2 |
| 15 | 9.45 | 15 | 13.2 | 29 | 24.5 | 27.5 | 27.4 | 24.8 | 26.6 |
| 20 | 12.6 | 20 | 17.6 | 27.5 | 23 | 26 | 24.6 | 21.3 | 23.5 |
| 30 | 18.9 | 30 | 26.4 | 26 | 14 | 21.9 | 16.3 | 12.9 | 16.1 |
| 40 | 25.2 | 40 | 35.2 | 20 | 5 | 14.9 | 4.7 | 2.8 | 7.0 |
| 50 | 31.5 | 50 | 44 | 14 | −13.5 | −6.5 | −10.4 | −9.0 | −4.0 |
| 60 | 37.8 | 60 | 52.8 | 8.5 | −26 | — | −28.8 | −22.5 | −16.8 |
| 65 | 40.95 | 65 | 57.2 | 5.5 | −25.5 | −9.5 | −39.3 | −29.9 | −23.8 |
| 80 | 50.4 | 80 | 70.4 | −12.5 | — | — | — | — | — |

Freezing point depression was done by ASTM D-1177 method.
Fresh water was the base medium.
Equations:
Freezing point, (°F.) = 30.902 + 0.022099*percent PECP − 0.01695*percent PECP 2.
Freezing point, (°F.) = 32.761 − 0.4014*percent glycerol − 0.008666*percent glycerol 2.
Freezing point, (°F.) = 32.991 − 0.2936*percent POLS − 0.008935*percent POLS 2.

Results in Table 6 suggest that POLS or PECP could be used to prevent formation of gas hydrates. The freezing point depression data clearly suggest that this is a viable alternate to glycerol.

The foregoing description of the invention is merely intended to be explanatory thereof, and various changes in the details of the described method and apparatus may be made within the scope of the appended claims without departing from the spirit of the invention.

What is claimed is:

1. A method for drilling a well, comprising:
   rotating a drill string to cut a borehole into the earth;
   circulating a drilling fluid through the drill string and through the annulus between the drill string and the wall of the borehole;
   checking the drilling fluid for evidence of shale dispersion from the wall of the borehole into the drilling fluid; and
   adding alcohol and partially hydrolyzed polyacrylamide to the drilling fluid in an amount sufficient to reduce said shale dispersion, said alcohol being selected from the group consisting of (1) an alcohol of less than 8 hydroxyl groups and less than 16 carbon atoms; (2) an acylic polyol having 3 to 80 carbon atoms and 2 to 60 hydroxyl groups; (2) a monoalicyclicpolyol having 5 to 30 carbon atoms and 2 to 10 hydroxyl groups; and (4) a cyclicetherpolyol having 6 to 1800 carbon atoms, 2 to 450 hydroxyl groups, and 2 to 600 ether linkages.

2. A method for drilling a well in a formation which will subject a drilling fluid to shale dispersion from the borehole, comprising:
   admixing the drilling fluid with alcohol and partially hydrolyzed polyacrylamide in an amount sufficient to substantially reduce said shale dispersion from the borehole into the drilling fluid, said alcohol being selected from the group consisting of (1) an alcohol of less than 8 hydroxyl groups and less than 16 carbon atoms; (2) an acylic polyol having 3 to 80 carbon atoms and 2 to 60 hydroxyl groups; (2) a monoalicyclicpolyol having 5 to 30 carbon atoms and 2 to 10 hydroxyl groups; and (4) a cyclicetherpolyol having 6 to 1800 carbon atoms, 2 to 450 hydroxyl groups, and 2 to 600 ether linkages;
   rotating a drill string to cut a borehole into the earth; and
   circulating the drilling fluid through the drill string and through the annulus between the drill string and the wall of the borehole.

3. The method of claim 1 or claim 2 wherein the alcohol comprises glycerol.

4. The method of claim 1 or claim 2 wherein the alcohol comprises a polycyclicpolyetherpolyol.

5. The method of claim 4 wherein the cyclicetherpolyol is a polycyclicpolyetherpolyol which is characterized by binodal molecular weight distribution, $M_w$ in excess of 50,000, said $M_w$ being determined in a three-column gel permeation chromatography, and being 0.5 to 10% w epoxy structures.

6. The method of claim 5 wherein the polycyclicpolyetherpolyol is further characterized by molecular structures which are no more than 20% free of associated cyclic formations.

7. The method of claim 1 or claim 2 comprising admixing about 1 to 26 weight percent salt, said weight percent being based on the total weight of drilling fluid.

* * * * *